United States Patent [19]

Bruning

[11] Patent Number: 5,251,732

[45] Date of Patent: * Oct. 12, 1993

[54] SUPPORT RAIL FOR COMPOSITE CONTINUOUS RAIL

[76] Inventor: Donald D. Bruning, 7137 Carter Trail, Boulder, Colo. 80301

[*] Notice: The portion of the term of this patent subsequent to Jun. 9, 2009 has been disclaimed.

[21] Appl. No.: 893,614

[22] Filed: Jun. 5, 1992

Related U.S. Application Data

[60] Continuation-in-part of Ser. No. 760,658, Sep. 16, 1991, Pat. No. 5,154,346, which is a division of Ser. No. 569,104, Aug. 17, 1990, Pat. No. 5,120,910.

[51] Int. Cl.$^5$ ............................................. B60M 1/34
[52] U.S. Cl. ..................... 191/22 DM; 191/29 DM; 238/10 E; 238/175
[58] Field of Search ................ 191/44.1, 39, 22 DM, 191/22 R, 29 DM, 29 R; 238/10 E, 14.05, 14.3, 14.4, 14.5, 14.9, 14.12, 14.13, 122, 129, 135, 149, 150, 151, 175, 228

[56] References Cited

U.S. PATENT DOCUMENTS

| | | | |
|---|---|---|---|
| 206,738 | 8/1878 | Leypoldt | 238/148 |
| 209,739 | 11/1878 | Welch | 238/148 |
| 319,041 | 6/1885 | Van Choate | 238/148 |
| 477,675 | 6/1892 | Moxham | 238/228 |
| 588,541 | 8/1897 | Walkins . | |
| 805,166 | 11/1905 | Steinberger | 191/29 DM |
| 1,042,545 | 10/1912 | Gamwell | 238/148 X |
| 1,229,847 | 6/1917 | Winner | 238/175 |
| 1,620,496 | 3/1927 | Spieckermann | 191/29 DM |
| 1,823,663 | 9/1931 | Oskow . | |
| 2,084,322 | 6/1937 | Crane . | |
| 2,266,145 | 12/1941 | Del Bignco | 238/228 |
| 2,540,433 | 2/1951 | Evans . | |
| 3,016,845 | 1/1962 | Lemelson . | |
| 3,111,265 | 11/1963 | Huber | 238/129 |
| 3,222,464 | 12/1965 | Dehn . | |
| 3,341,669 | 9/1967 | Martin et al. | 191/29 DM |
| 3,461,250 | 8/1969 | Dehn . | |
| 3,528,608 | 9/1970 | Dashew et al. | 238/228 |
| 3,566,048 | 2/1971 | Martin | 191/22 DM X |
| 3,583,631 | 6/1971 | Christiansen . | |
| 3,637,957 | 1/1972 | Janzow et al. | 191/29 DM |
| 3,752,396 | 8/1973 | Bustin | 238/14 |
| 3,813,502 | 5/1974 | Bommart . | |
| 3,830,989 | 8/1974 | Laurent | 191/22 DM |
| 3,850,271 | 11/1974 | Hillmann | 191/22 DM |
| 3,872,577 | 3/1975 | Kugler et al. . | |
| 3,892,299 | 7/1975 | Kilburg | 191/29 DM |
| 3,917,039 | 11/1975 | Maitland | 191/29 DM |
| 4,016,961 | 4/1977 | Howell, Jr. | 191/22 DM X |
| 4,047,600 | 9/1977 | Maitland | 238/14.4 X |
| 4,448,350 | 5/1984 | Phillips | 238/14.4 X |
| 4,665,833 | 5/1987 | Fleishman et al. . | |

FOREIGN PATENT DOCUMENTS

| | | | |
|---|---|---|---|
| 1027124 | 5/1953 | France | 238/10 E |
| 31830 | 3/1981 | Japan | 191/22 DM |
| 90224 | 6/1982 | Japan | 191/29 DM |
| 240534 | 11/1985 | Japan | 191/22 DM |
| 252033 | 12/1985 | Japan | 191/22 DM |
| 143233 | 6/1986 | Japan | 191/22 DM |
| 265746 | 11/1988 | Japan | 191/29 DM |
| 215637 | 8/1989 | Japan | 191/22 DM |
| 34441 | 2/1990 | Japan | 191/29 DM |
| 95939 | 4/1990 | Japan | 191/29 DM |
| 70654 | 11/1942 | Norway . | |
| 256434 | 8/1926 | United Kingdom . | |

Primary Examiner—David A. Bucci
Assistant Examiner—James T. Eller, Jr.
Attorney, Agent, or Firm—Homer L. Knearl

[57] ABSTRACT

A composite continuous surface rail is constructed by combining a load-bearing support rail divided into segments to allow for thermal expansion with a continuous surface rail that slideably engages the support rail and spans any number of support rail segments. The continuous top or surface rail includes a running rail and an expansion rail. The expansion rail is provided to absorb thermal expansion of the running rail while continuing to provide a continuous composite rail surface. The surface rail and/or support rail may be electrified. An electrified running rail and expansion rail will provide an electrified composite rail with electrical continuity.

13 Claims, 6 Drawing Sheets

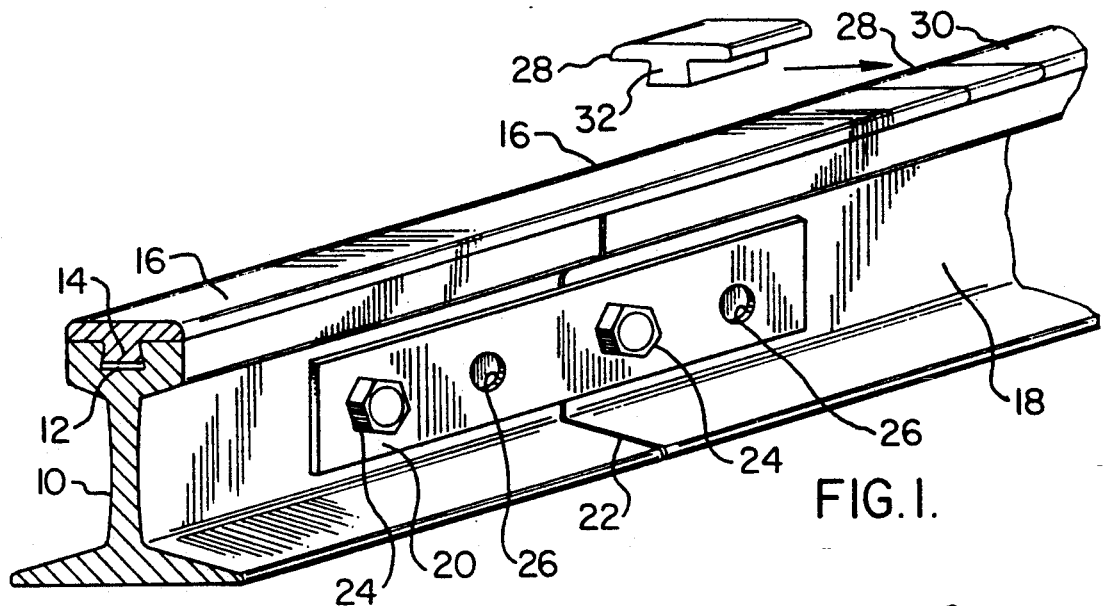
FIG. 1.
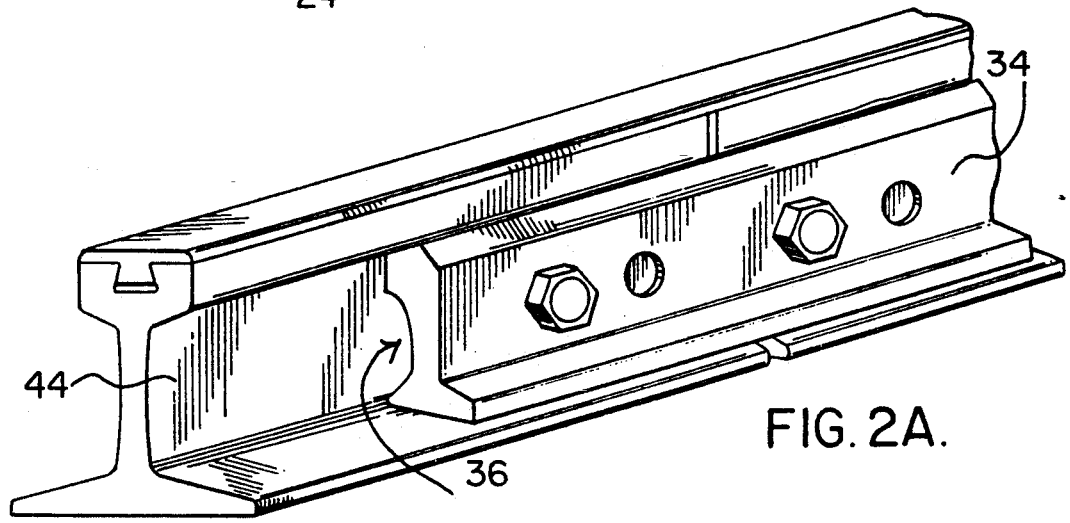
FIG. 2A.
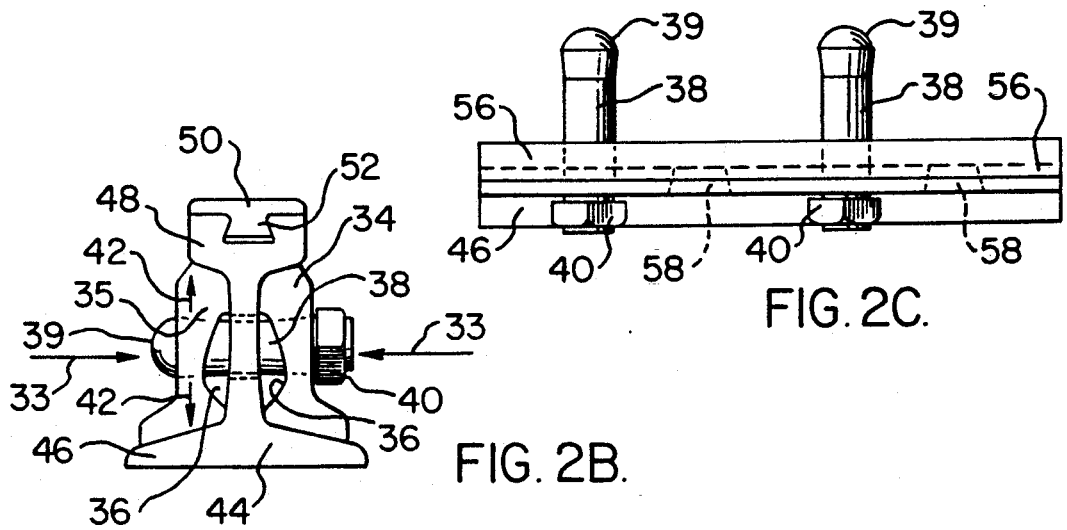
FIG. 2B.
FIG. 2C.

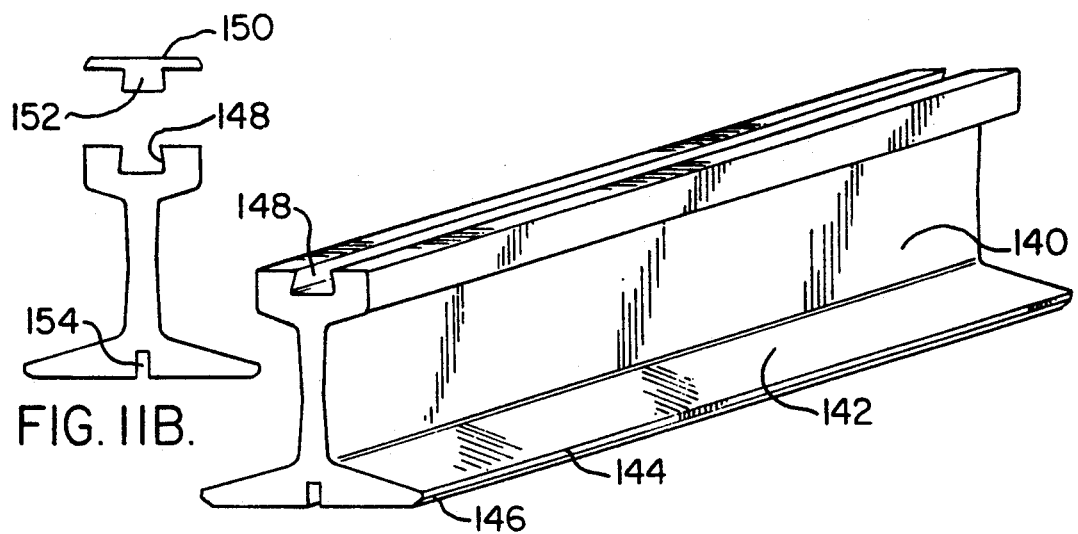
FIG. 11B.
FIG. 11A.
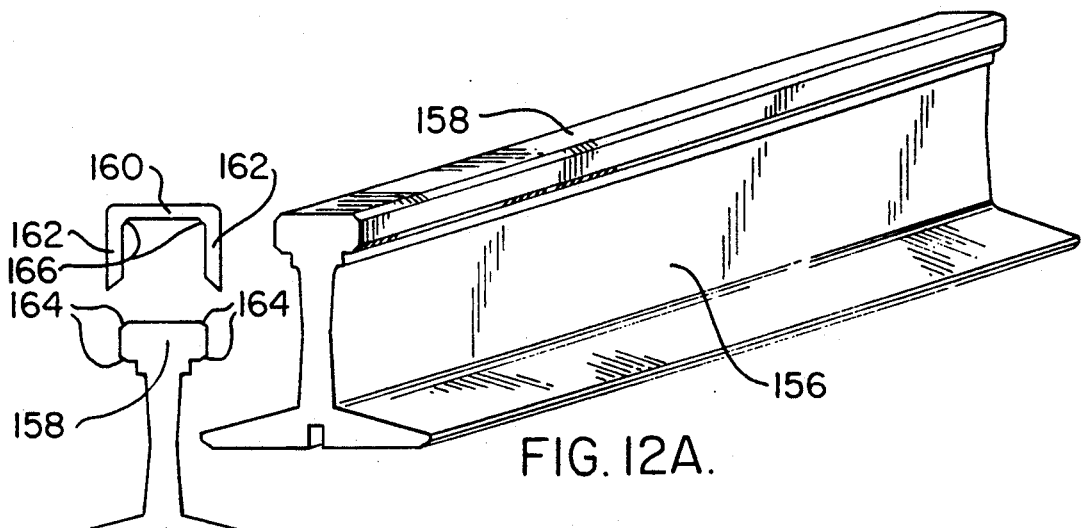
FIG. 12B.
FIG. 12A.
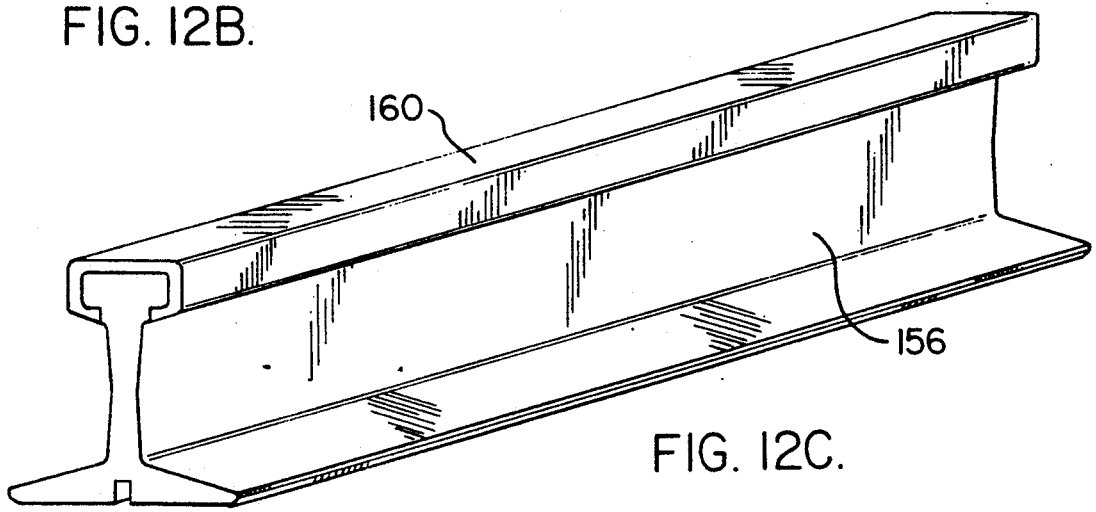
FIG. 12C.

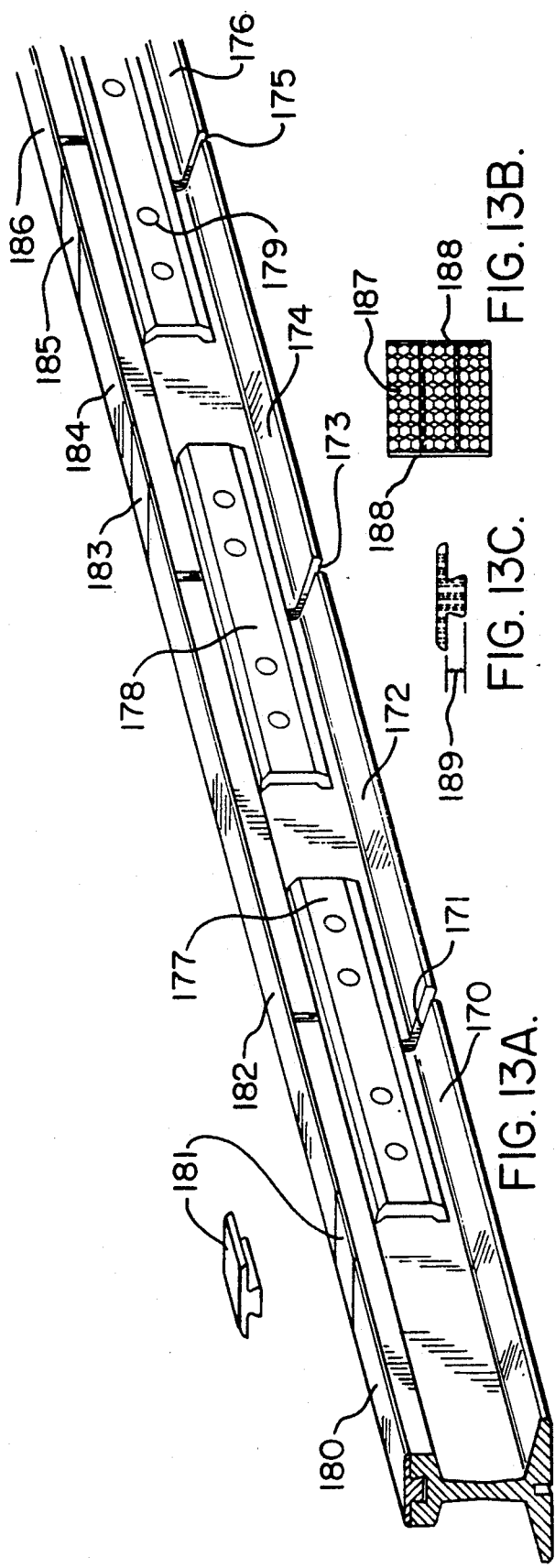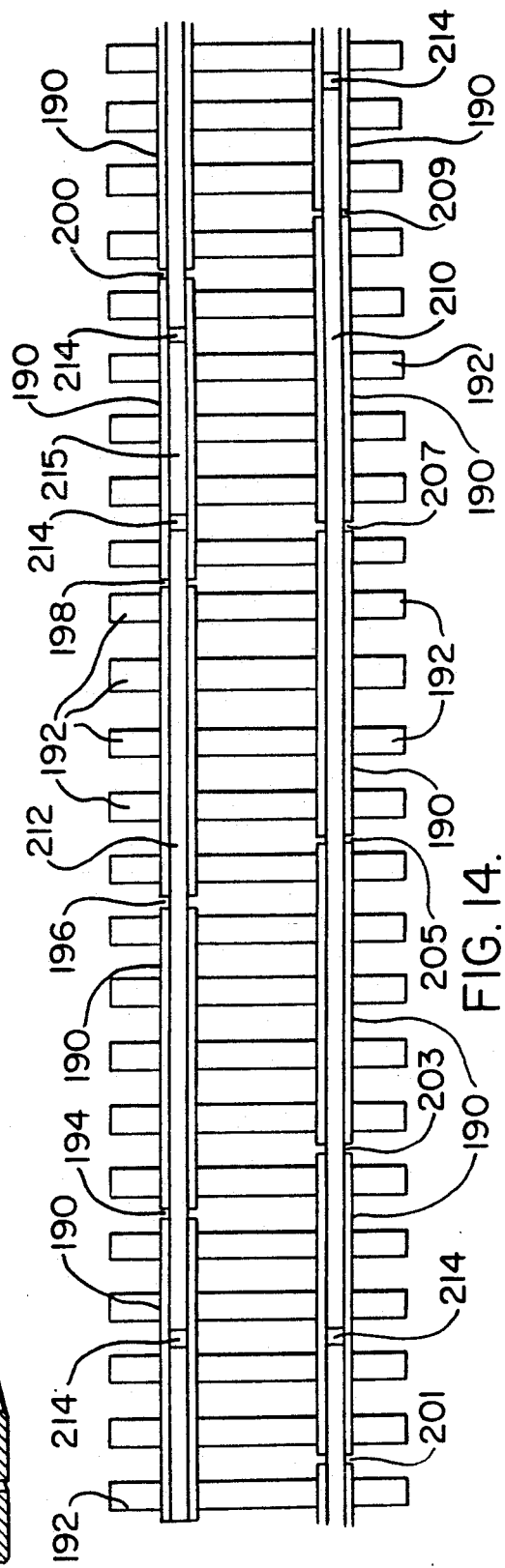

SUPPORT RAIL FOR COMPOSITE CONTINUOUS RAIL

CROSS REFERENCE TO RELATED PATENTS

This application is a continuation-in-part of U.S. patent application Ser. No. 07/760,658 filed Sep. 16, 1991, now U.S. Pat. No. 5,154,346 issued on Oct. 13, 1992, and entitled "Rail Mounting Clip for Railroad" which is a division of U.S. patent application Ser. No. 07/569,104 filed Aug. 17, 1990, now U.S. Pat. No. 5,120,910 issued on Jun. 9, 1992 and entitled "Minimum-Joint Electrified Rail system."

FIELD OF THE INVENTION

This invention relates to continuous surface rails for a railroad. More particularly the invention relates to a composite rail and the composite rail components that make up a rail with a continuous surface.

BACKGROUND OF THE INVENTION

A long standing problem with continuous rails in railroad tracks has been the expansion and contraction of long continuous or welded rails. Typically, the entire rail in a continuous rail section is made of steel, steel alloys, brass or aluminum. These materials expand and contract significantly with the changes in temperature. For example, with a wide range in temperature variations from $-20°$ C. to $+40°$ C., the expansion or contraction of a continuous steel rail 1 km long can be 0.9 meters. This amount of expansion or contraction will distort or even buckle the track. On straightaways the track will ripple, but the thermal expansion problem is particularly severe on curves. An expanding rail at a curve will push laterally against tie plates and cause the rails in double rail track to spread more than the standard rail separation. Such spreading of the rails causes derailment of wheeled vehicles running on and guided by the rails.

Of course these problems have been solved in the past by shortening the rail sections and providing enough longitudinal separation at abutment joints in successive rails to absorb the thermal expansion of the rails. However, such joints are noisy and provide a rough ride. In addition the separated abutting joints are severe wear points for the rails, and this produces high maintenance cost for the railroad. In addition if the rail is electrified, it is difficult to maintain electrical continuity across the rail section joint from one rail to the next abutting rail.

One solution for the electrical continuity problem in the past has included electrified rail sections that have electrical cables connecting across rail joints as in U.S. Pat. No. 3,813,502. Further, composite rails are known and, for example, include rails shown in U.S. Pat. No. 2,540,433, Norwegian Patent 70654, and United Kingdom Patent Specification 256,434. None of these prior designs are directed to handling the thermal expansion in continuous surface rails. In all cases the composite rail contains fixedly attached components so that in essence they are a solid rail.

SUMMARY OF THE INVENTION

It is an object of this invention to provide a continuous surface rail that does not distort with thermal expansion.

It is another object of this invention to provide a continuous surface rail that may be electrified.

The problem of thermal expansion in continuous rails has been solved by fabricating a composite surface rail which effectively eliminates joints between abutting rail sections at the wheel contact surface of the rails. The composite rail comprises a sectional support rail for carrying the weight of the wheeled vehicle riding on the rails and a surface rail that inserts in and slideably engages the top surface of the support rail. Accordingly, this surface rail may be viewed as a rail mounted in a rail. For ease of installation, the surface rail is more flexible than the support rail. Further, the surface rail has a length independent of the support rail sections and spans the abutment joints between support rail sections. A wheeled vehicle riding on the surface rail sees no mechanical joint or electrical discontinuity across support rail abutment joints.

In addition the surface rail includes two types of surface rails for insertion in the top surface of the support rail. Those two types are a running surface rail and an expansion rail. The running surface rail may be of any length and typically would span multiple support rail sections. The expansion surface rail is a short surface rail constructed to expand the contract; it is placed between the ends or adjacent running rails. The expansion rail fills the gap between running rails, absorbs thermal expansion of the running rail, and provides surface continuity between running rails.

In one aspect of the invention the head of the support rail is shaped to receive and guide the surface rail. After the support rail slideably engages the surface rail it serves to guide the more flexible surface rail to the head of the next abutting support rail. The surface rails mate with the support rails in a number of ways. There may be grooves in the top surface of the support rail and matching beads on the under surface of the surface rail. The surface rail bead may have beveled edges that fit between matching counter-beveled edges on the top surface of the support rail. The surface rail may be a box channel shaped to slide over the head of the support rail.

If the composite rail is to be electrified, the support rail and/or surface rail may be made of electrically conductive materials. In one embodiment the support rail is non-conductive while the surface running rail is conductive. The expansion rail may be conductive or insulative depending on whether the rail is in the middle of an electrical control block or at the end of an electrical control block.

BRIEF DESCRIPTION OF DRAWINGS

FIG. 1 shows a preferred embodiment of the continuous surface composite rail.

FIGS. 2A, 2B and 2C show a fish plate for connecting abutting support rails.

FIGS. 11A and 11B show a support rail with a head having a dovetail groove and a foot designed to mate with the tie plates of FIGS. 16 and 17.

FIGS. 12A, 12B and 12C show a support rail with a head shaped to slideably engage a box channel surface rail and a foot designed to mate with the tie plates of FIGS. 16 and 17.

FIG. 13A is illustrative of surface rails that span multiple joints in support rails and surface rails that are shorter than a support rail.

FIGS. 13B and 13C show an expansion rail used between the surface running rails.

FIG. 14 illustrates application of the invention to double rail track.

DETAILED DESCRIPTION OF THE INVENTION

Figure 3A:
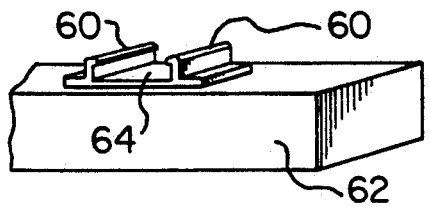
FIG. 3A shows a spring-loaded clip for mounting the support rail on interconnecting ties.

One embodiment of the invention is shown in FIG. 1. Support rail 10 is made of electrically non-conductive or insulative material such as poly-carbonate materials, carbon fibers, ceramics, or combinations thereof. Any insulative material that has sufficient structural strength to support a vehicle on the rail may be used. The top of the support rail 10 contains a notch 12 that runs the length of rail 10. In the preferred embodiment, notch 12 is a dovetail groove. This dovetail groove is designed to receive the dovetail bead 14 of a continuous surface, conductive rail 16 on top of support rail 10.

Support rails 10 are abutted end-to-end to form any desired length of rail in a track system. In FIG. 1, support rail 10 is joined to abutting support rail 18 at joint 22 by fish plate 20 and a matching counterpart fish plate (not shown) on the other side of rails 10 and 18. The fish plate brackets are usually bolted together through the body of the support rail with bolts and nuts.

In a light railroad implementation with low loads on the rails, the fish plates are plastic with bolts and nuts molded as a part of each fish plate. Each molded bolt (see FIG. 2C) has a nub 39 and shaft 38 molded on the fish plate. The nub 39 snapfits through holes 58 in a matching fish plate on the other side of the rail. For example, nubs (not shown) from the opposite-side fish plate pass through holes in rails and snapfit through holes 26 (FIG. 1) in fish plate 20. False nuts 24 are molded into fish plate 20 to simulate real nuts.

The surface rail 16 is attached to both rails 10 and 18 by inserting the dovetail bead 14 into matching dovetail groove 12 in the rails. The flat portion of conductive surface rail 16 rests on the top surface of support rails 10 and 18. The bead 14 of rail 16 riding in groove 12 holds the conductive rail in place. Thus surface rail 16 spans the support rail abutment joint 22 so that relative to a wheeled vehicle or electro-motive device riding on the rail there is no physical discontinuity or electrical discontinuity of the composite continuous conductive rail at joint 22.

The surface rail 16 terminates at some point along the track where it is desirable to end an electrical control zone. In FIG. 1, rail 16 terminates where it abuts against floating insulator 28. Insulator 28 thus defines the end of one electric control zone or control block defined by conductive surface rail 16 and the beginning of the next control block defined by conductive surface rail 30.

Floating insulator 28 has a dovetail bead 32 to engage groove 12 in the support rail in the same manner as surface rail 16. Insulator 28 floats on support rail 18 in that it may slid along the top of rail 18. This allows for expansion and contraction of the surface rails due to changes in temperature.

FIGS. 2A and 2B show an alternative design for the plastic fish plates. Fish plates 34 and 35 are concave relative to the support rail 44 so that a cavity 36 is formed between plates 34 and 35 and the non-conductive support rails.

As illustrated in end view in FIG. 2B, nub 39 of shaft 38 is pressed through a hole in the fish plate by deforming the fish plates 34 and 35 inward as depicted by arrows 33. Fish plates 34 and 35 are identical; when installed, plate 35 is reversed in direction relative to plate 34. Thus, shafts 38 of one plate extend through holes 58 (FIG. 2C) of the other plate. After nub 39 on shaft 38 of fish plate 34 has snapped through the hole in fish plate 35, plates 34 and 35 are held deformed toward the support rail 44. As a result, plates 34 and 35 want to extend in an upward and downward direction, as depicted by arrows 42, against the foot 46 and head 48 of rail 44.

FIG. 2C shows details of the fish plate or bracket 34. Shafts 38 and nuts 40 are molded as a part of plate 34. The position of the innermost edge of the concave inner surface of plate 34 is illustrated by dashed line 56. Holes 58 in the plate are tapered to receive the nubs 39 of shafts 38 that snapfit into holes 58. The molded shape of nuts 40 is a matter of choice since they are provided for aesthetics in simulating the appearance of conventional track installation.

FIG. 3A illustrates a clip 64 for holding the support rail to a support member or railroad tie 62. Alternatively, the clip could hold the support rail directly to the roadbed. Clip 64 has spring tension arms 60. A support rail may be snapped into the clip 64 between the arms 60 as shown in FIG. 3B and be held by the clip on tie 62 or a roadbed (not shown).

Figure 3B:
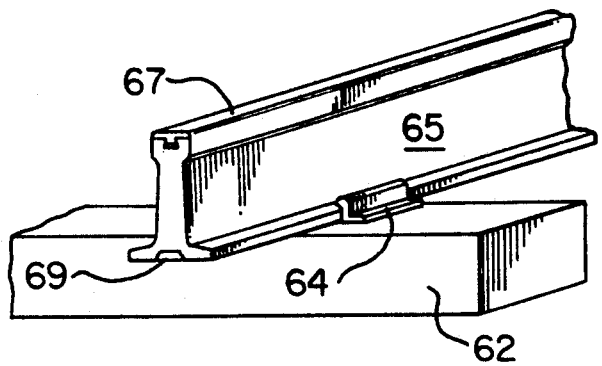
FIG. 3B shows a support rail with a conductive surface rail and a second strip which is conductive, the surface rail for providing power to the vehicle and second strip for providing control signals.

FIG. 3B shows a non-conductive support rail 65 and continuous conductive, surface rail 67 similar to rail 16 in FIG. 1. In addition FIG. 3B shows a second conductive strip 69 (shown in end view at the end of the composite rail) positioned at the bottom of support rail 65. One or more conductive strips 69 might be used to conduct control signals, such as a radio frequency control signals, down the length of the track. Conductive strip 69 would be a continuous or minimum-joint strip in the same manner as surface rail 67.

Figure 4A:
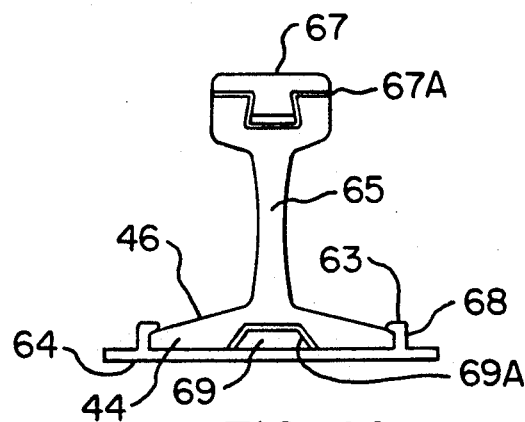
FIG. 4A shows a conductive support rail having insulating layers to insulate the support rail from the conductive top or surface rail.

A end view of support rail 65 with surface rail 67 and conductor 69 is shown in FIG. 4A. In addition in FIG. 4A, the support rail 65 is made of a conductive metal such as steel, brass, aluminum or tin. In this embodiment with a conductive support rail, there must be an insulating layer 67A and 69A between the support rail 65 and surface rail 67 and conductor 69. Insulating layers 67A and 69A are preferably coatings of polycarbonate materials. Plastics such as Vinyl or Teflon might be used.

Also shown in the end view in FIG. 4A is a space between the bottom of surface rail 67 and the bottom of the dovetail groove. This space is provided so that a electrical wire might be trapped in the space after passing through a hole (not shown) in the support rail. Thus the conductive surface rail conductor 67 can receive electrical power from a power source.

Figure 4B:
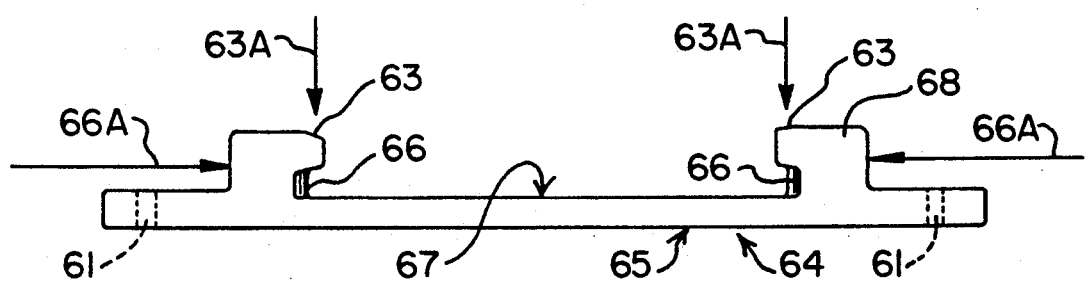
FIGS. 4B and 4C show a preferred embodiment of a rail clip for mounting the rail on ties or a roadbed.
Figure 4C:
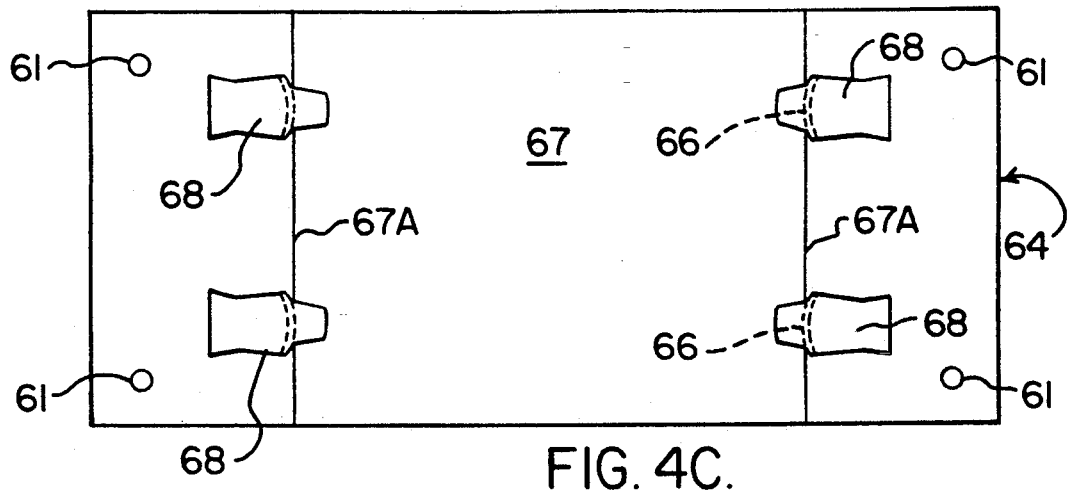

A snap in rail clip 64 is shown in FIGS. 4A, 4B and 4C. Clip 64 is precast or molded out of flexible poly-carbonate materials and has posts 68 with ears 63 that snap fit over the base 46 of support rail 44.

In the detail of FIG. 4B, the clip 64 has upstanding posts 68 molded as a single piece with base 65. Upstanding posts 68 have arcuate, vertical-fluted surfaces 66 and ears 63 to hold a rail firmly in place after it is snapped into clip 64. Fluted surfaces 66 would be shaped out of a harder material than the plastic clip and for example might be a metal insert such as steel, brass, or aluminum, molded into the clip. Further the rail base is held in a recessed area 67.

In FIG. 4C, there is a top view of clip 64 in FIG. 4B. Four posts 68 are shown. Arcuate fluted surfaces 66 are shown by dashed lines. The edges 67A of recess 67 are indicated. Also holes 61 in base plate 65 are provided so that the clip 64 can be fastened to railroad ties or roadbed with nails, spikes or bolts through the holes.

When a rail is pushed down into clip 64, base 65 and posts 68 flex to allow posts 68 to open sufficiently for the base of the rail to slip past ears 63. After ears 63 snap over the base of the rail, the rail is kept from moving vertically and is held in recess 67 by ears 63 applying retentive forces in direction of arrows 63A. In addition the rail is kept from slipping transverse to the direction of the rail by the edges of recess 67 and by retentive forces (in the direction of arrows 66A) from the inner arcuate surfaces 66 of posts 68. The rail is kept from slipping along the length of the rail by the vertical fluted surfaces 66.

Figure 5:
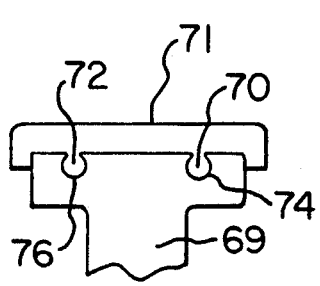
FIG. 5 shows a double cylindrical groove and matching bead for attaching the surface rail to the support rail.
Figure 6:
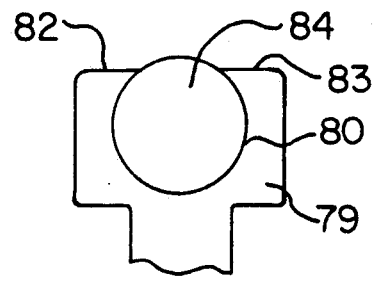
FIG. 6 shows a support rail head with a cylindrical groove to receive a cylindrical shaped top rail.
Figure 7:
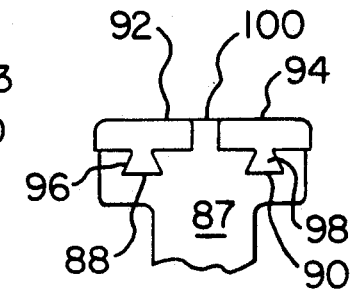
FIG. 7 shows a support rail head with two continuous surface rails with dovetail beads.

FIGS. 5 through 7 illustrate various alternative embodiments for slideably engaging the continuous surface rail on top of the sectional support rail. In FIG. 5, the top or surface rail 71 has two rounded beads 70 and 72 for engaging rounded grooves 74 and 76 respectively in support rail 69.

In FIG. 6, the support rail 79 has a top surface containing a cylindrical groove 80 with ears 82 and 83. Continuous conductor 84 has a cylindrical cross-sectional shape. When the conductor 84 is pressed into groove 80, ears 82 and 83 of the groove snap over the conductor. Conductor 84 has a diameter somewhat greater than the depth of groove 80 so that up to 20% of the diameter of the conductor protrudes above the surface of the support rail. This will insure good electrical contact between the conductive rail member 84 and wheels of an electro-motive device drawing electrical power from the rail.

In FIG. 7, the support rail 87 has two dovetail grooves 88 and 90 to engage two surface rails 92 and 94 respectively. Top rails 92 and 94 each have a dovetail bead 96 and 98 for engaging dovetail grooves 88 and 90. If surface rails 92 and 94 are conductive, they may be insulated from each other by a ridge 100 on the head of a non-conductive support rail 87.

Figure 8:
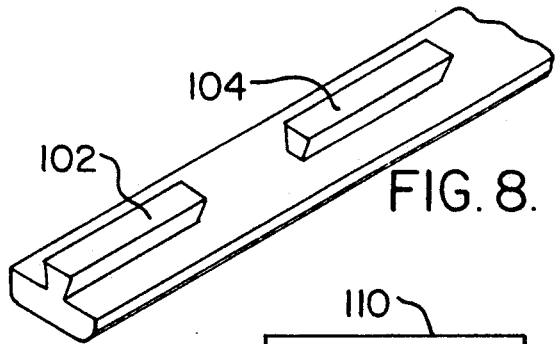
FIG. 8 is the bottom view of a surface rail with discontinuous beads at spaced intervals.

In FIG. 8, an alternative embodiment of the continuous surface rail is shown. In this embodiment, the dovetail bead 102 is discontinuous. The bead need not extend the length of the surface rail. There only needs to be a bead at spaced intervals. Two beads 102 and 104 are shown. The interval between beads should be short enough so that good engagement with the support rail is maintained when the surface rail is slideably engaged into the matching groove in the support rail.

Figure 9:
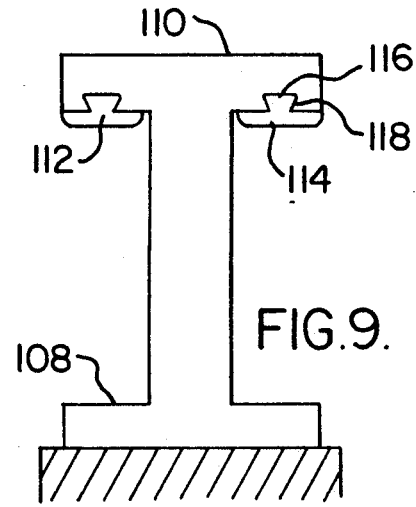
FIG. 9 shows a monorail embodiment where the support rail carries two continuous conductive rails under the support rail overhang.
Figure 10:
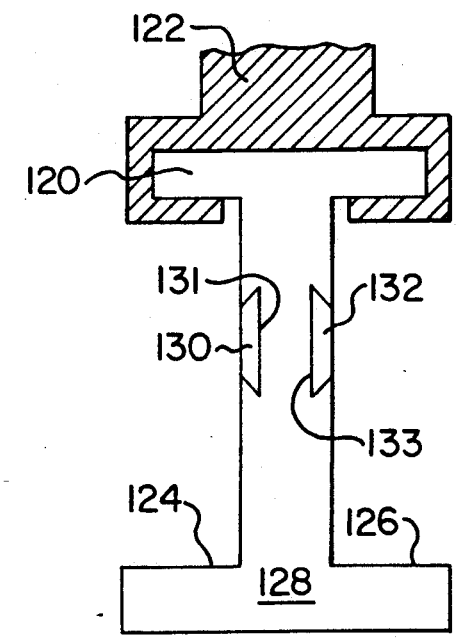
FIG. 10 shows a hanging monorail embodiment where the continuous conductive rails are slideably engaged to a vertical portion of the I-beam.

FIGS. 9 and 10 illustrate mating of continuous, conductive surface rails to sectional non-conductive monorails. The non-conductive monorail would be built of strong relatively stiff material to support the weight of the vehicle travelling on the rail. Accordingly, the mono-rail would be in sections which would be assembled to form a track. The surface rails would be flexible and of any length and would span any number of monorail sections thereby providing electrical continuity for a predetermined length of track.

In the monorail illustrated as an end view in FIG. 9, the rail is supported at the base 108 by pylons or a roadbed in cross-section. The electro-motive vehicle rides on the top surface 110 of the monorail and carries two electrical conductive wipers or wheels which make contact with conductive surface rails 112 and 114. The continuous surface rails have a dovetail bead 116 and slideably engage matching dovetail groove 118.

In the monorail illustrated as an end view in FIG. 10, the rail is supported at the top 120 of the I-beam by hanging support 122 in cross-section. The electro-motive vehicle rides on wheels running on the top surfaces 124 and 126 of the base 128 of the I-beam. The vehicle also carries two electrical conductive wipers or wheels which make contact with conductive surface rails 130 and 132. The continuous conductive surface rails have a dovetail shape and slideably engage matching dovetail grooves 131 and 133 respectively.

In FIGS. 11A and 11B another embodiment for the support rail is illustrated. Support rail 140 differs from the support rail 10 in FIG. 1 in the shape of the foot of the rail. Foot 142 of support rail 140 has its lateral edges shaped to provide a vertical surface 144 and an angular surface 146 oriented approximately 45° from the vertical. The angles of the surfaces are selected so that the foot of the rail 140 will mate with the tie plate shown in FIGS. 15 to 17. The fastening of the rail to the tie plates and ties will be described in more detail hereinafter in reference to FIGS. 15 to 17.

The support rail 140 in FIG. 11A and 11B has a dovetail groove 148 in the head of the support rail to receive a continuous surface rail 150. Just as in FIG. 1, the dove tail 152 on surface rail 150 slideably engages the head groove 148 in support rail 140. The surface rail may extend for any distance; the length of the surface rail has no relationship to the location of support rail joints except that preferably surface rail joints do not occur at support rail joints.

Support rail 140 in FIGS. 11A and 11B also has a foot groove 154. Groove 154 might be used to carry a conductive wire. If support rail 140 is made of a flexible material such as Acetal Nylons and polycarbonates, so that it may be shaped to a desired path for a track, groove 154 could receive a stiffening rib (not shown). The rib could be attached to the road bed on which the support rail is mounted.

FIGS. 12A, 12B and 12C show a support rail 156 similar to rail 140 in FIG. 11A except that the head 158 of rail 156 is designed to receive a box channel shaped surface rail 160. Surface rail 160 is laid on top of head 158 and then slideably engaged to the support rail by bending the sides 162 of the channel around the head 158 to produce the composite rail shown in FIG. 12C. The bending of the sides of the channel surface rail 160 would be accomplished by applying a combination of localized heat and pressure (rollers) to the sides 162 of the channel surface rail. The heat would soften the surface rail and pressure rollers would bend the sides around the head. The surface rail is hooked over the head by this bending operation. The surface rail must remain slideable relative to the head 158 of the support rail 156.

The head 158 has its four corners 164 beveled. In addition the inside corners 166 of the channel 160 are filled to match the beveled corners 164 of the support rail head. This provides more material in the surface rail at the corners of the head in the composite rail; the corners of the surface rail are the points of greatest wear as railway cars ride on the composite rail.

Depending on the application of the continuous composite rails, the support rail may be either a electrically conductive or non-conductive material. Similarly, the continuous surface rail may be conductive or non-conductive. Some examples of support rail material would be steel, aluminum, iron, brass, ceramic, thermo plastics, and thermoset plastics; some examples of surface rail materials would be aluminum, copper, steel, steel alloys, thermo plastics, and thermoset plastics. If the surface rail is to be electrified, then the support rail should be nonconductive or an insulating layer may be placed between the surface rail and the support rail as shown in FIG. 4A.

FIG. 13A shows a typical configuration of the continuous composite rail using short support rail segments to illustrate the independence of the length of the surface rail from the joints in the support rail. Surface rails may span multiple joints in the support rail or may be shorter than a support rail segment. Four support rail segments 170, 172, 174, and 176 abut at joints 171, 173, and 175 respectively. The support rail segments are fastened together with fish plate brackets 177, 178, and 179 (bolts for the fish plate brackets are not shown). Continuous, surface, running rails 180, 182, 184 and 186 are separated by surface, expansion rails 181, 183, and 185. The running rails and expansion rails all slideably engage the support rail as previously described. The expansion rails are designed to compress or expand longitudinally (along the length of the rail) to absorb expansion of the running rails.

FIGS. 13B and 13C show the preferred structure for an expansion rail. The structure of the high load-bearing expansion rail 181 is a honeycomb as most clearly seen in the top view in FIG. 13B. The wall thickness and the material used in the walls 187 of the honeycomb should have sufficient load-bearing strength so that the walls of the honeycomb will transfer the axle weight of the wheeled vehicle riding on the rails to the head of the support rail. At the same time the material should be resilient enough so that if the surface rail contracts after expansion, the expansion rail will expand and continue to provide a continuous surface from a first running rail to the next successives running rail. The materials used in the expansion rail may be the same as the materials used in the running rail as for example, steel, steel alloys, thermo plastics, and thermoset plastics so long as the material has the necessary strength and resilience.

FIG. 13C is an end view of the honeycomb expansion rail in FIG. 13B. The honeycomb rail has no top or bottom walls. It does have end walls 188 and may have side walls or the honeycomb may be shaped at the sides of the rail to provide side walls. However, the main structure of the honeycomb rail must be the honeycomb and any exterior walls to the honeycomb must not restrict the expansion/contraction characteristics of the honeycomb structure. If desired to insure mechanical and electrical continuity with the surface running rails, the end of the running rail and the abutting ends 188 of the expansion rail may be welded, fused or bonded.

As shown in the FIG. 13A, the dove tail bead on the surface, running rail has a depth shorter than the depth of the dovetail groove in the head of the support rail. This is done to reduce friction between the running rail and the support rail so that the running rail may more easily slide in the support rail. The depth 189 of dove tail bead for the expansion rail may be the same as the dovetail bead on the running rail. However for added strength in transferring the load from the top of the expansion rail to the support rail, the depth 189 of dovetail bead on the expansion rail may have the same depth as the depth of the groove in the head of the support rail. In such an implementation, the load-bearing on the top of the honeycomb will be transferred to the bottom of the dovetail groove as well as the top of the support rail head. The added friction between the expansion rail and the support rail does not impede the slideable engagement between the running rail and the support rail.

The expansion rails may be electrically conductive or non-conductive. If the surface rail is conductive, the expansion rails would be nonconductive at the end of electrical control blocks. Within an electrical control block the expansion rail would be conductive to provide electrical continuity from one running rail to the next running rail. They would then perform the dual function of compensating for thermal expansion in the surface rails and insulating abutting surface rails so as to form electrical control blocks in the rail system. The expansion rail will be insulative if formed from thermo plastic or thermoset plastics. It will be conductive if formed from conductive metals or plastics plated with conductive metals.

Each surface rail would normally span many support rail segment joints, but the surface rails may be of any length. FIG. 13A illustrates a surface, running rail 182 that spans two joints 171 and 173. FIG. 13A also illustrates a running rail 184 that is shorter than a single support rail segment 174 whereby there are two expansion rails 183 and 185 between joints 173 and 175.

FIG. 14 shows two rail track implemented with the composite rails of the present invention. Support rail segments 190 are the same length and positioned on ties 192 so that abutting joints 194, 196, 198, and 200 for one rail of the track are offset respectively from abutting joints 201, 203, 205, 207, and 209 for the other rail. Running rail 210 spans joints 203, 205, 207, and 209 and is supported by more than three support rail segments 190. Similarly surface running rail 212 spans joints 194, 196 and 198. On the other hand running rail 215 is shorter than one segment and positioned as shown in FIG. 14 does not span any joints.

All surface rails slideably engage the support rail segments to slide relative to the support rail when the surface rails expand or contract due to thermal expansion. The slideable engagement also facilitates installation of the surface rails on the support rail segments.

Expansion rails 214 in FIG. 14 are resilient and expand or contract to absorb thermal expansion of the surface rails. The expansion rails have the same cross-sectional shape as the running rails and may also be conductive or non-conductive if the running rails are electrified.

While the track in FIG. 14 illustrates a preferred embodiment for two rail track, it will be appreciated by one skilled in the art that ties and support rail segments could be preassembled in a different configuration. In preassembled two rail track the ends of the support rail segments would be aligned. The joints between abutting and parallel support rails would then be aligned rather than offset as shown in FIG. 14. This configuration would allow quick installation of parallel support rails on a roadbed. The two rail track would be finished by adding the continuous surface running rails and expansion rails.

Figure 15:
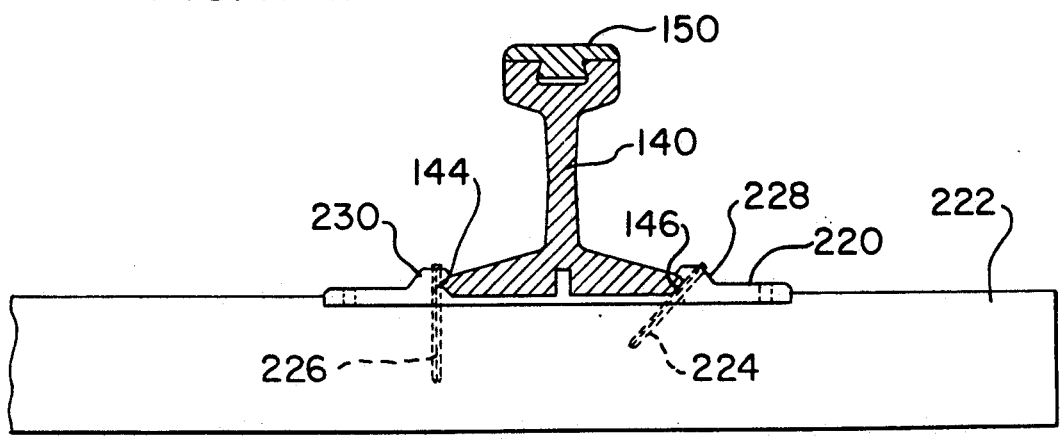
FIG. 15 shows a tie plate that slideably engages the foot of the support rails in FIGS. 11 and 12 is pinned to the tie plate and tie with fluted pins.

The tie plates for fastening the support rails of FIGS. 11-14 to the ties are shown in FIGS. 15-17. FIG. 15 shows an assembled composite rail from FIG. 11A in cross-section fastened in tie plate 220 on tie 222. Tie 222 is notched so that tie plate 220 is recessed in the notch in the tie. Fluted pins 224 and 226 pass through holes in tie plate 220 and holes in clamping shoes 228 and 230 and are driven into tie 222. Thus pins 224 and 226 fasten the rail to the tie plate and the tie plate to the tie.

Pins 224 and 226 are fluted so as to engage the edge of the foot of the support rail 140 as the pins are driven into the tie. Pin 224 is oriented at 45° to the vertical and its flutes deform and engage 45° surface 146 at the edge of the foot of support rail 140. Pin 226 is oriented vertically and its flutes deform and engage the vertical surface 144 at the edge of support rail foot. Since the pins engage the support rail foot, they tend to hold the support rail firmly against motion along the direction of the rail.

Figure 16B:
FIGS. 16A and 16B show a tie plate where the fluted pins are vertically oriented.
Figure 17B:
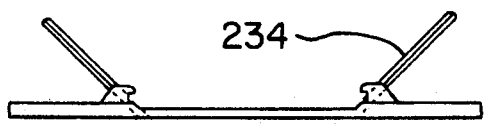
FIGS. 17A and 17B show a tie plate where the fluted pins are oriented at 45° from the vertical.
Figure 16A:
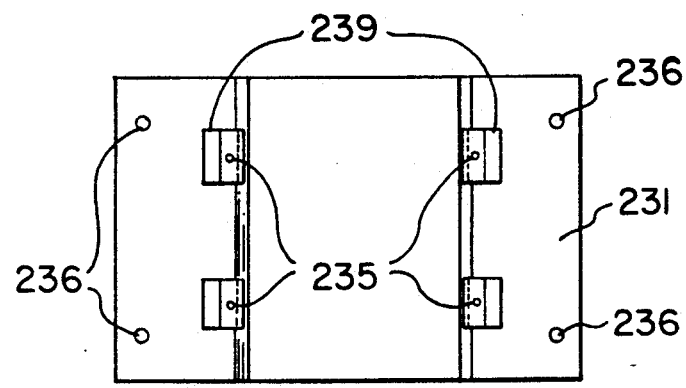
Figure 17A:
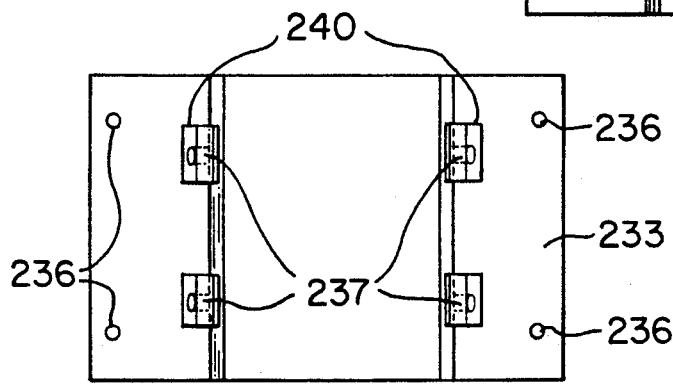

FIGS. 16A and 16B are top and side views of the tie plate with the holes for spikes oriented vertically. Spikes 232 are shown in FIG. 16B. FIGS. 17A and 17B are top and side views of the tie plate with the holes for spikes 234 oriented at 45° from the vertical. In both embodiments the tie plates 231 and 233 are designed for use with four spikes. In tie plate 231 holes 235 through the clamp shoes 239 and tie plate are oriented vertically. In tie plate 233 holes 237 through clamp shoes 240 and the tie plate are oriented 45° from vertical. In addition to the holes for spikes 232 and 234, each of the tie plates also has four holes 236 to receive spikes (not shown) for holding the tie plates 231 and 233 to ties.

Vertical or non-vertical orientation of spike holes in the tie plates depends on the forces the rail will be subject to. Vertical orientation provides most resistance to vertical force from the rail. Non-vertical orientation provides more resistance to horizontal force from the rail but less resistance to vertical force from the rail. Tie plate 220 in FIG. 15 used a combination of vertical and non-vertical spike holes. One skilled in the art will appreciate that depending on the horizontal and vertical forces on the rail and the materials used for the rail, tie plates, and ties, other angular orientations of the spike holes may be selected.

While a number of preferred embodiments of the invention have been shown and described, it will be appreciated by one skilled in the art, that a number of further variations or modifications may be made without departing from the spirit and scope of my invention.

What is claim is:

1. A support rail carrying a continuous surface rail to form a composite rail for a railroad track having a continuous operative surface for vehicles running on the composite rail, the surface rail having a predetermined shape for mounting on said support rail, said support rail comprising:
    a support rail section shaped as a rail with a foot, a head and a body, said section having a length independent of the surface rail and having ends for connection with ends of adjacent support rail sections whereby a long support rail with expansion joints is formed; and
    said head of each of said sections has an exterior surface shaped to slideably hook onto the predetermined shape of the surface rail so that the surface rail is engaged with said adjacent support rail sections and slides relative to each of said support rail sections as the surface rail or said support rail sections expands or contracts.

2. The support rail of claim 1 wherein
    said exterior surface of said head has opposing first and second surfaces and:
    said first surface is positioned relative to the second surface to slideably engage a constricted cross-sectional dimension in the predetermined shape of the surface rail whereby the surface rail slides along the length of said support rail sections but is otherwise constrained on said head.

3. The support rail of claim 2 wherein the predetermined shape is a dovetail bead on the surface rail and:
    said first and second surfaces are lateral walls of a dovetail groove in said head.

4. The support rail of claim 1 wherein the the predetermined shape of the surface rail is a box channel, and wherein
    said head has a substantially rectangular cross-sectional shape with opposing first and second surfaces; and
    said first and second surfaces are exterior lateral walls that slideably engage interior side walls of the surface rail channel.

5. The support rail of claim 1 wherein said support rail is fabricated from an electrically non-conductive material.

6. The support rail of claim 1 wherein said support rail is fabricated from an electrically conductive material.

7. The support rail of claim 6 further comprising:
    an insulating layer on all surfaces of said head that contact the surface rail.

8. Support rail apparatus in a composite rail, the composite rail having a surface rail of a length to provide a continuous surface for contact with vehicles running on the composite rail, said support rail apparatus comprising:
    support rail means being discontinuous and extending along the length of the surface rail for supporting the surface rail and vehicles running on the composite rail; and
    said support rail means having engaging means for slideably engaging the surface rail so that the surface rail slides freely in said support rail means to adjust to thermal expansion or contraction of the surface rail,
    said engaging means restraining movement of the surface rail relative to said support rail means except along the length of the surface rail.

9. The support rail apparatus of claim 8 wherein said support rail means is electrically non-conductive.

10. The support rail apparatus of claim 8 wherein:

said support rail means is electrically conductive.

11. The support rail apparatus of claim 10 further comprising:

insulating means for electrically insulating said support rail means from the surface rail.

12. The support rail apparatus of claim 8 wherein the surface rail has an undersurface with a dovetail bead, and said engaging means is a dovetail groove.

13. The support rail apparatus of claim 8 wherein the surface rail is a box channel, and wherein said engaging means is a substantially rectangular shaped head on said support rail means; and said head has exterior walls that slideably engage interior walls of the surface rail channel.

* * * * *